US012627137B2

(12) United States Patent
Jung

(10) Patent No.: US 12,627,137 B2
(45) Date of Patent: May 12, 2026

(54) CROWBAR CIRCUIT, IN PARTICULAR FOR A VOLTAGE TRANSFORMER, IN EXPLOSION-PROTECTED APPLICATIONS

(71) Applicant: Pepperl+Fuchs SE, Mannheim (DE)

(72) Inventor: Martin Jung, Mannheim (DE)

(73) Assignee: Pepperl+Fuchs SE, Mannheim (DE)

( * ) Notice: Subject to any disclaimer, the term of this patent is extended or adjusted under 35 U.S.C. 154(b) by 212 days.

(21) Appl. No.: 18/675,408

(22) Filed: May 28, 2024

(65) Prior Publication Data

US 2024/0413630 A1 Dec. 12, 2024

(30) Foreign Application Priority Data

Jun. 6, 2023 (DE) .......................... 102023114833.8

(51) Int. Cl.
*H02H 9/04* (2006.01)
*H02H 9/00* (2006.01)
*H02H 9/02* (2006.01)

(52) U.S. Cl.
CPC ............ *H02H 9/041* (2013.01); *H02H 9/005* (2013.01); *H02H 9/025* (2013.01)

(58) Field of Classification Search
CPC ........ H02H 9/005; H02H 9/008; H02H 9/025; H02H 9/041

(Continued)

(56) References Cited

U.S. PATENT DOCUMENTS

| | | | | |
|---|---|---|---|---|
| 5,144,517 A | * | 9/1992 | Wieth | H02H 11/002 |
| | | | | 361/111 |
| 2004/0174648 A1 | * | 9/2004 | Frey | H02H 9/008 |
| | | | | 361/90 |

(Continued)

FOREIGN PATENT DOCUMENTS

| | | | | |
|---|---|---|---|---|
| DE | 4000674 A1 | * | 8/1990 | ............. H02H 9/041 |
| DE | 102006003620 A1 | * | 8/2007 | ............. H02H 9/008 |

(Continued)

OTHER PUBLICATIONS

Machine translation of Bommer et al. German Patent Document DE 4000674 A1 Aug. 1990 (Year: 1990).*
Machine translation of Bay German Patent Document DE 102006003620 A1 Aug. 2007 (Year: 2007).*
German Examination Report issued in App. No. DE102023114833, dated Nov. 2, 2023, 6 pages.

*Primary Examiner* — Kevin J Comber
(74) *Attorney, Agent, or Firm* — Blueshift IP; Robert Plotkin

(57) ABSTRACT

A crowbar circuit for a voltage transformer, comprising: a triggering device for triggering a short circuit via input terminals depending on control voltage; a comparator configured to trigger the triggering device depending on a comparator voltage at a comparator input and a reference voltage threshold value, a Zener diode with a breakdown voltage in series with a fifth resistor, connected between an input terminal and the comparator input, such that when the input voltage exceeds the breakdown voltage, the comparator voltage triggers the short circuit; a series connection of a seventh resistor, an eighth resistor, the fifth resistor and a sixth resistor, wherein load current at an output flows through the seventh and sixth resistors and wherein the comparator input is connected to a node between the fifth and eighth resistors, and the series connection is connected between the input terminals, such that upon exceeding a predetermined threshold current, the comparator voltage triggers the short-circuit.

10 Claims, 3 Drawing Sheets

(58) Field of Classification Search
USPC ........................................................ 361/54
See application file for complete search history.

(56)                    References Cited

U.S. PATENT DOCUMENTS

2018/0309285 A1* 10/2018 Jacobson ............... H02H 9/042
2019/0058326 A1*  2/2019 Esposito ............. H02H 1/0007

FOREIGN PATENT DOCUMENTS

EP          1855365 A1 * 11/2007 ........... H03K 17/305
EP          1388192 B1   10/2012

* cited by examiner

CROWBAR CIRCUIT, IN PARTICULAR FOR A VOLTAGE TRANSFORMER, IN EXPLOSION-PROTECTED APPLICATIONS

TECHNICAL FIELD

The invention relates to crowbar circuits for limiting overvoltages and overcurrents in applications in explosion-protected environments. The invention relates in particular to measures for reducing the power rating of Zener diodes and resistors of the crowbar circuit.

TECHNICAL BACKGROUND

Crowbar circuits are often used to safely prevent overvoltage and overcurrent events of a device/equipment that provides electrical energy in the explosion-protected area. The principle of crowbar circuits is to short-circuit the input voltage source by means of a semiconductor switch (MOSFET, thyristor) when an overvoltage and/or overcurrent is detected, thus quickly triggering a safety fuse connected in series to the input voltage source. Since the response time of the circuit as a whole (including comparator, filtering etc.) is usually several microseconds to milliseconds due to the triggering time of the semiconductors and due to EMC or functional requirements, crowbar circuits are often combined with Zener diodes in parallel with the output in order to further limit the voltage transient of the output voltage of any overvoltage.

For example, document U.S. Pat. No. 5,144,517 A discloses a protective barrier device comprising a DC voltage source at a first and a second input terminal and a first and a second output terminal, wherein the first output terminal is in a first low-impedance series path with the first input terminal and the second output terminal is in a second low-impedance series path with the second input terminal. Current detection means are provided for detecting current in at least one of the first and second series paths. Further, an overcurrent level signal generating means is provided for generating an overcurrent level signal in accordance with a detected overcurrent level consisting of a current exceeding a preselected level. An overcurrent level signal generating means is provided for amplifying the overcurrent level signal provided by the overcurrent level signal generating means to form a trigger signal by means of an amplifying device fed at least partially by the excess current in at least one of the first and second series paths. A crowbar circuit for switching a low-resistance current path between the first and second series paths in accordance with the trigger signal is also provided.

Furthermore, as disclosed in document EP 1 388 192 B1, a further impedance is provided in series with the Zener diode between the output terminals, such that a higher output voltage than intended is present at the output terminals until the semiconductor switching element is closed.

When using Zener diodes for voltage limiting and resistors for current limiting, high power losses occur in the event of a fault, which leads to increased design effort due to the provision of additional cooling elements, limits the possible packing density and places high demands on the thermal load capacity of these components.

When using a crowbar, in which an overvoltage or overcurrent is switched off using a power semiconductor switch, voltage and current transients can occur within the crowbar circuit and at the output terminals of the device, which can be critical for use in explosion-protected application areas. The device must therefore undergo extensive testing to ensure explosion safety. Likewise, a distance must be maintained between the functionally available output voltage and the available output current and the maximum output voltages and output currents relevant for the test in the event of a fault.

It is therefore the object of the present invention to provide an improved crowbar circuit which suppresses a propagation of high voltage and current transients to the output side of the device or prevents their occurrence.

DISCLOSURE OF THE INVENTION

This problem is solved by the crowbar circuit for a device according to claim 1, in particular for use in explosion-protected applications.

Further embodiments are given in the dependent claims.

According to a first aspect, a crowbar circuit is provided, in particular for use in an electronic device, for example, comprising:

a triggering device for triggering a short circuit across input terminals depending on a control voltage;

a comparator which is configured to trigger the triggering device for triggering the short circuit depending on a comparator voltage at a comparator input of the comparator and depending on a predetermined reference voltage threshold value, a Zener diode with a predetermined breakdown voltage in series with a fifth resistor, which are connected between one of the input terminals and the comparator input, such that when the breakdown voltage is exceeded by the applied input voltage, the comparator voltage exceeds or falls below the reference voltage threshold value, thus triggering the short circuit;

a series connection of a seventh resistor, an eighth resistor, the fifth resistor and a sixth resistor, wherein a load current at an output of the crowbar circuit flows through the seventh and sixth resistors and the comparator input is connected to a node between the fifth and eighth resistors, in particular directly, wherein the series connection is connected between the input terminals, such that when a predetermined threshold current is exceeded, the comparator voltage exceeds or falls below the reference voltage threshold value, thus triggering the short-circuit.

Crowbar circuits usually include Zener diodes that limit the voltage until a controllable semiconductor switch is being closed upon detection of an overvoltage in order to short-circuit the voltage input. This causes a safety fuse connected in series to trigger. If the current is too high, the semiconductor switch should also trigger, and thus protect the downstream applications from thermal overload.

The power rating of a Zener diode used in a crowbar circuit is usually designed for 1.7 times the rated fuse current of the upstream safety fuse. This is disadvantageous as it can result in a high power loss in the application circuit above the desired level.

The above crowbar circuit has a short-circuit cut-off that short-circuits the input side when an overload in the form of an overvoltage or an overcurrent is detected and triggers a safety fuse which is located there. Upon closing of the semiconductor switch, the input side is short-circuited, which causes the safety fuse to open. At the same time, any capacitive load present on the output side of the crowbar circuit is discharged.

The crowbar circuit comprises a triggering device, in particular with a semiconductor switch, e.g. in the form of a MOSFET or thyristor, which is triggered directly or by means of a preamplifier circuit in order to short-circuit the input side. The triggering device or the semiconductor switch is controlled depending on the state of a comparator. Depending on the level of a comparator voltage at a comparator input in relation to a predetermined reference voltage threshold value, a control signal is generated for the triggering device/semiconductor switch, depending on which the short circuit is caused by closing the semiconductor switch, i.e. switching it to a low impedance.

In principle, the above circuit can be designed in two complementary variants such that the short circuit is triggered when it is determined that reference voltage threshold value is exceeded or that the reference voltage threshold value is fallen below, respectively. Complementary design in this case means that the polarities are inverted, and inverse conductivity types of the semiconductor components used are used in each case, such that in the case of the comparator, a short circuit is triggered upon exceeding or—with a correspondingly complementary design—upon falling below the reference voltage threshold value.

This means that the crowbar circuit is triggered depending on a comparator voltage that is set depending on an input voltage applied on the input side and depending on a flowing load current. In the load path between the input side and the output side of the crowbar circuit, there can be a seventh resistor between a first input terminal and a first output terminal, and a sixth resistor between a second input terminal and a second output terminal. The values of the sixth and seventh resistors are dimensioned such that a predetermined triggering current or a current exceeding this leads to a change in the comparator voltage at the comparator input, which leads to a switching of the control signal on the output side of the comparator and thus to the triggering of the triggering device.

Furthermore, the Zener diode and the sixth resistor can be connected in series, in particular directly between the input terminals.

Furthermore, the comparator input of the comparator can be connected to a series connection of a Zener diode in the reverse direction and a fifth resistor. Depending on the design, the resulting comparator voltage is based on one of the supply voltage potentials, in particular the higher of the supply voltage potentials. The comparator voltage then corresponds to a voltage value at the input of the comparator that is dependent on the breakdown voltage of the Zener diode and a voltage drop across the fifth resistor at the input of the comparator. The breakdown voltage of the Zener diode is set in such a way that when the load current is 0 and a predetermined triggering voltage is exceeded, the comparator voltage exceeds/falls below the reference voltage threshold, and thus triggers the triggering device.

In order to set the threshold values for a predetermined triggering current and the maximum Zener diode current without inserting an additional impedance in series with the Zener diode, an eighth resistor is used to connect a first output terminal to the comparator input of the comparator. Due to the seventh resistor in the load path, the output voltage potential is high at low output currents, and the comparator input of the comparator is biased with an offset voltage. This means that even a small additional current through the Zener diode is sufficient to trigger the crowbar circuit. As a result, the thermal load on the Zener diode is lower in the event of a fault, and a smaller design or lower power rating of the Zener diode can be used. Furthermore, a smaller cooling surface can be provided.

At higher output currents, the output voltage across the output terminals is low, and the comparator input of the comparator is biased to a lesser extent via the resistor. This enables a higher current through the output terminals and a higher triggering current of the crowbar.

It may be provided that the comparator input is directly connected, in particular electrically, via the fifth resistor to one of the first or second output terminals at which a high and a low output potential is provided.

Furthermore, the fifth resistor can be directly connected to the output terminal for the low output potential, in particular electrically, wherein the resistance value of the seventh resistor is greater than the resistance value of the sixth resistor.

In an alternative complementary design, the fifth resistor may be directly connected to the output terminal for the high output potential, in particular electrically, wherein the resistance value of the seventh resistor is lower than the resistance value of the sixth resistor.

It may be provided that the resistance value of the seventh resistor is greater than the resistance value of the sixth resistor. Thus, as the output current increases, the voltage at the first output terminal decreases faster than it increases at a second output terminal. As a result, the input voltage at the comparator input also decreases as the output current increases.

It may be provided that a further Zener diode is connected in series with the eighth resistor in the reverse direction.

In the transition range between open circuit and short circuit at the output terminals, the voltage offset at the comparator input decreases continuously. By inserting the optional additional Zener diode in series with the eighth resistor between the output terminal for the higher voltage potential and the comparator input of the comparator, the voltage offset is completely eliminated once the output current reaches a certain threshold value, and the triggering threshold of the output current in the medium and high load range can be further increased.

It may be provided that the comparator comprises a shunt reference with a predetermined reference voltage threshold value or a bipolar transistor, wherein the reference voltage threshold value is determined by its base-emitter-voltage.

If a higher variation of the trigger threshold with respect to the load current is acceptable, an NPN bipolar transistor or an N-channel MOSFET, for example, can be used instead of the comparator. This implementation requires fewer components, as the comparator can be dispensed with. In addition, the power consumption of the circuit is reduced as there is no need to supply the comparator. Any analog signals are therefore not distorted by an unwanted cross-current.

Furthermore, a low-pass filter can be provided between the triggering device and the comparator such that a time delay is provided when the short circuit is triggered if it is detected that the comparator voltage exceeds or falls below the reference voltage threshold value, respectively.

Consequently, the activation of the triggering circuit from the semiconductor switch and the preamplifier circuit can be done via a low-pass filter in order to be able to set a time delay for activating the triggering circuit or for closing the semiconductor switch. This allows an inertia of the crowbar circuit to be realized in order to prevent very short voltage peaks from immediately triggering the safety fuse.

Furthermore, a current limitation can be realized within a load current carrying line, which limits the flowing load current when the comparator voltage exceeds or falls below the reference voltage threshold value.

Accordingly, a limiting transistor can be provided in the current path, which can be designed as an NPN bipolar transistor or as a self-locking N-channel MOSFET. As long as the load current is less than the triggering current of the crowbar circuit, no significant current flows through the comparator such that the limiting transistor is conducting.

As soon as the predetermined triggering current of the load current is being exceeded, the comparator switches, and a current flows which reduces the voltage at the control terminal of the limiting transistor, thus limiting the load current. In this way, the current increase due to a short circuit on the output side, for example, can be limited until the semiconductor switch is triggered.

Furthermore, one of the input connections can be provided with a safety fuse that interrupts the current flow when the short circuit is triggered.

BRIEF DESCRIPTION OF THE DRAWINGS

Embodiments are explained in more detail below with reference to the accompanying drawings, wherein.

DESCRIPTION OF EMBODIMENTS

Figure 1:
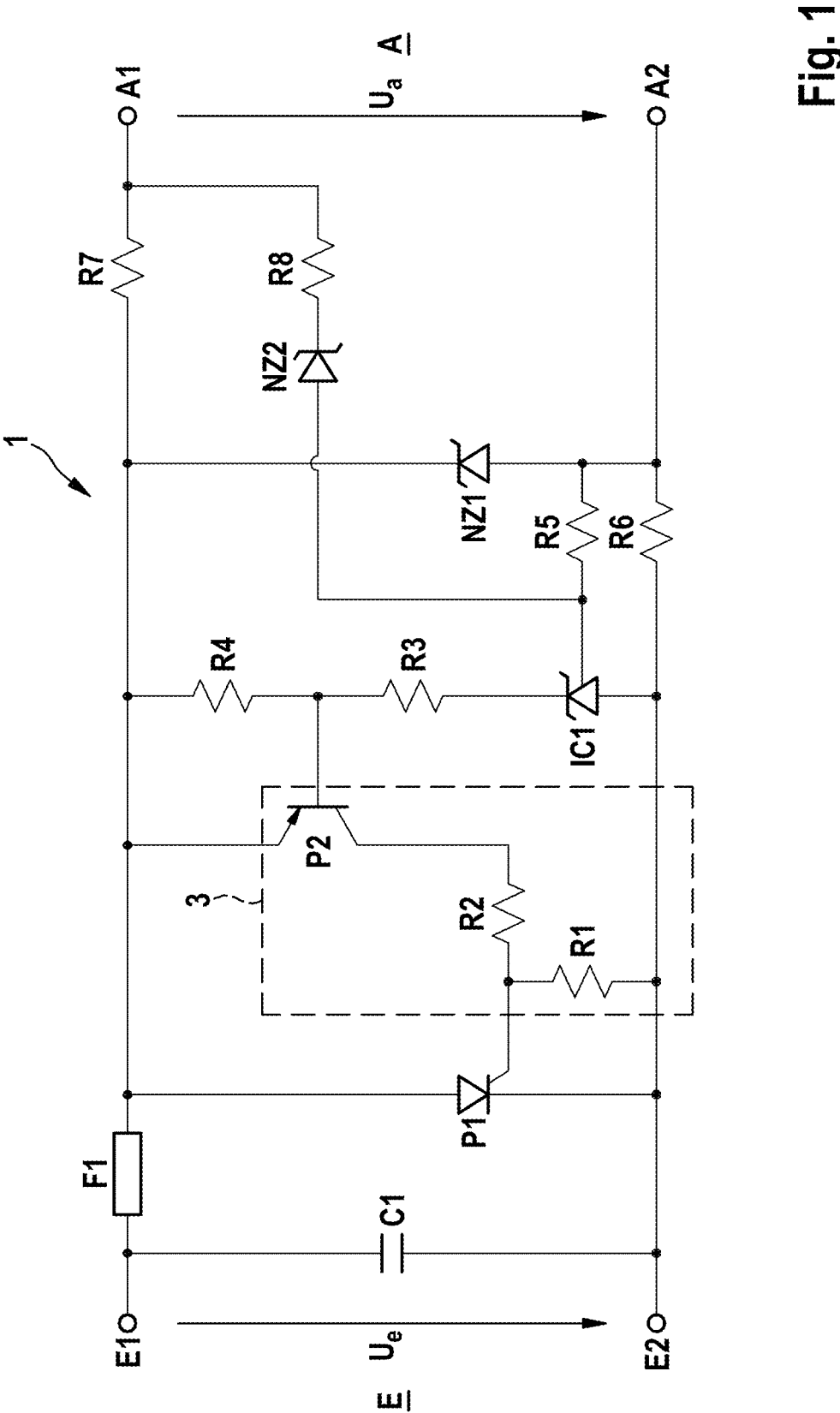
FIG. 1 is a schematic representation of a crowbar circuit according to a first embodiment of the invention.

FIG. 1 shows a crowbar circuit 1 for exemplary use in a power supply unit with a voltage converter for explosion-protected applications.

The crowbar circuit 1 is arranged between an input side E with a first and a second input terminal E1, E2 for applying an input voltage $U_e$ and an output side A with a first and a second output terminal A1, A2 for tapping an output voltage Ua between a high and a low output potential. A capacitance C1 between the input terminals E1, E2 is used to smooth the input voltage against voltage interference.

The aim of the crowbar circuit 1 is to trigger a safety fuse F1 by short-circuiting the input terminals E1, E2, by which the input voltage $U_e$ is applied, using a semiconductor switch P1. The safety fuse F1 is in series with the input voltage $U_e$ such that it is permanently opened by the short-circuit current.

In the present embodiment, the semiconductor switch is designed as a thyristor P1, which can be closed by means of a preamplifier circuit 3. Alternatively, the semiconductor switch can be designed as a MOSFET or as any other type of semiconductor switch.

An anode terminal of the thyristor P1 is connected to the first input terminal E1 via the safety fuse F1, and a cathode terminal of the thyristor P1 is connected directly to the second input terminal E2, such that a high short-circuit current flows through the thyristor P1 and interrupts the safety fuse when the input terminals are short-circuited. There may be a transformer between the safety fuse F1 and the thyristor P1, e.g. in order to provide a galvanic isolation.

A direct connection is understood in this context to be the conductive, very low-resistance electrical connection as being created by a conductor path or a conductor connection, i.e. without an electrical or electronic component being connected in between.

The preamplifier circuit 3 can have a PNP transistor P2 in series with a first resistor R1 and a second resistor R2. Instead of a PNP transistor, an FET or the like can also be provided. The node located between the first resistor R1 and the second resistor R2 can be connected to the gate terminal of the thyristor P1. A first terminal of the first resistor R1 can be connected to the second input terminal directly or via a further component. A second terminal of the first resistor R1 can be connected to the gate terminal of the thyristor P1 directly or via a further component.

A first terminal of the second resistor R2 can be connected to an emitter terminal of the PNP transistor P2 directly or via a further component. A second terminal of the second resistor R2 can be connected to the gate terminal of the thyristor P1 directly or via a further component. The collector terminal of the PNP transistor P2 can be connected to the safety fuse F1 or directly to the input terminal, either directly or via another component.

The base input of the PNP transistor P2 can be connected via a node between a third and fourth resistor R3, R4, which can be connected in series with a shunt reference IC1 between the voltage potential of the first input terminal E1 and the voltage potential of the second input terminal E2.

A first terminal of the fourth resistor R4 can be connected to the base connection of the PNP transistor P2 directly or via a further component. A second terminal of the fourth resistor R4 can be connected to the voltage potential of the first input connection E1 directly or via a further component. A first terminal of the third resistor R4 can be connected to the base terminal of the PNP transistor P2 directly or via a further component. A second terminal of the third resistor R4 can be connected to the output of the shunt reference directly or via another component.

The shunt reference IC1 can be embodied as a comparator the output of which controls a semiconductor switch. If a comparator voltage is applied to a comparator input of the shunt reference IC1 that is higher than a predetermined reference voltage threshold value inherent to the component, the shunt reference IC1 becomes conductive, and the voltage at the base connection of the PNP transistor P2 drops. As a result, the PNP transistor P2 becomes conductive and sets off the thyristor P1.

In principle, the circuit part of the crowbar circuit 1 described up to this point provides a functionality for triggering a short circuit when the comparator voltage at the comparator input of the shunt reference exceeds the predetermined reference voltage threshold value. This functionality can also be realized by a variety of other circuit designs without deviating from the crowbar circuit in the meaning of the present invention.

In order to realize a triggering functionality in the crowbar circuit 1 in the event of an overvoltage between the input terminals, a first Zener diode NZ1 can be provided, which applies a voltage potential, which is reduced by the breakdown voltage of the first Zener diode NZ1 starting from the potential at the first input terminal, to the comparator input of the shunt reference IC1. For this purpose, the Zener diode NZ1 can be connected with its cathode connection to the potential of the first input connection E1 and with the anode connection via a fifth resistor R5 to the comparator input of the shunt reference IC1 and via a sixth resistor R6 to the second input connection E2. For this purpose, the anode connection of the Zener diode NZ1 can be connected directly or via a further component to a first terminal of the sixth resistor R6, which in turn is connected to the second output connection directly or via a further component. The second terminal of the sixth resistor R6 can be connected to the second input terminal directly or via a further component.

By means of the fifth resistor R5, the comparator input of the shunt reference is protected with respect to the second output connection A2.

In order to limit the load current, a resistor arrangement with a seventh resistor R7, an eighth resistor R8, the fifth resistor R5 and the sixth resistor R6 can be provided. These can be connected in series as resistor dividers. The seventh resistor R7 and the sixth resistor R6 are located in the main current path of the load between the output terminals A1, A2, such that they cause a voltage drop in the voltage divider, which acts on the comparator voltage. The first output terminal A1 can also be connected to the comparator input of the shunt reference via the eighth resistor R8.

The resistance value of the seventh resistor R7 can also be distributed over several resistors in order to realize the resistance value. This has the advantage of achieving a better distribution of heat on the circuit board. The distribution over several resistors can of course also be carried out for the fifth, sixth and eighth resistors R5, R6, R8. When using several serial resistors to realize the resistance value of the seventh resistor R7, the tap for the eighth resistor R8 can be made after "each" of the resistors, but there must be at least one resistor between the tap and the first output terminal A1.

If the load current in the crowbar circuit 1 exceeds a threshold value, the resulting increase in output potential above the sixth resistor R6 at the second output terminal A2 pulls the control voltage upwards, provided that the resistance value of the sixth resistor R6 is less than the resistance value of the seventh resistor R7. These are dimensioned in such a way that the comparator voltage reaches or exceeds the reference voltage threshold value of the shunt reference when a predetermined trigger current is reached. This leads to a triggering of the thyristor due to the functionality of the triggering of a short circuit.

The circuit described above makes it possible to set different threshold values for the triggering current and the maximum Zener diode current without inserting an additional impedance in series with the Zener diode NZ1.

Due to the seventh resistor R7 at the first output terminal A1, the output potential thus depends on the load current corresponding to the voltage drop across the seventh resistor R7. At low output currents, the output potential at the first output connection A1 is high, and the comparator input of the shunt reference IC1 is being biased with an offset. As a result, a lower current through the Zener diode NZ1 is sufficient to trigger the crowbar circuit 1. This results in a lower thermal load on the Zener diode NZ1 in the event of a malfunction, such that a smaller design and a lower power rating can be provided.

At higher load currents, the potential at the first output terminal A1 is lower and the shunt reference IC1 is correspondingly less biased, i.e. the contribution to the comparator voltage is lower. This means that a higher load current is required to trigger the crowbar circuit 1. In the transition range, the bias voltage at the comparator input of the shunt reference IC1 decreases continuously, thus influencing the output characteristics.

In the series circuit of the seventh resistor R7, the eighth resistor R8, the fifth resistor R5 and the sixth resistor R6, a further Zener diode NZ2 can optionally be provided between the eighth resistor R8 and the fifth resistor R5, which is connected to the comparator input of the shunt reference IC 1.

The optional additional Zener diode NZ2 in series with the eighth resistor R8 switches off the bias voltage of the shunt reference IC1 completely above a certain output current, and the triggering threshold of the shunt reference IC1 can be further increased depending on the load current in the medium and high load range. In addition, the further Zener diode NZ2 prevents a current flow through the eighth and fifth resistor past the load applied to the output terminals.

Figure 2:
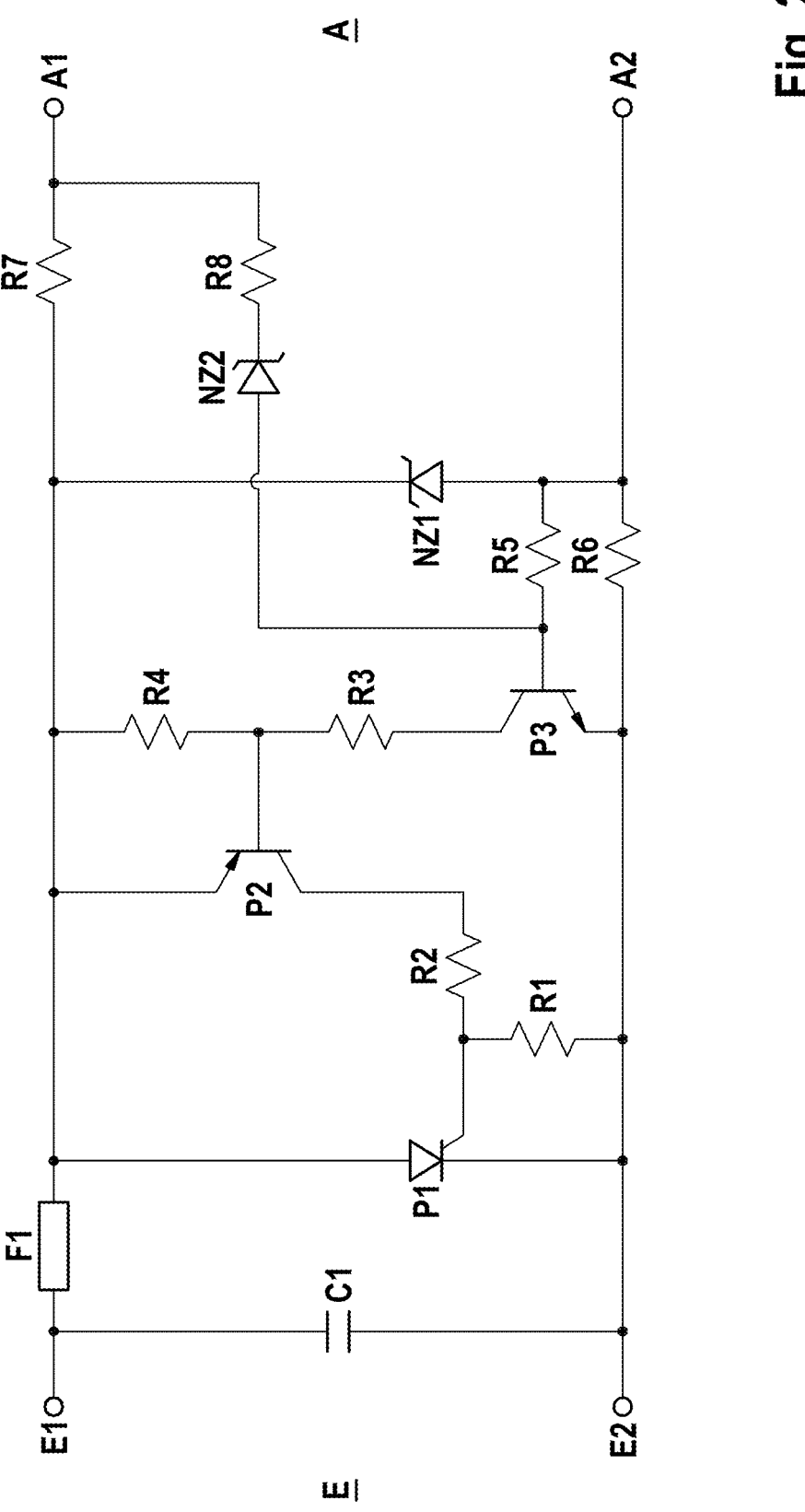
FIG. 2 is a schematic representation of a crowbar circuit according to a further embodiment.

The embodiment shown in FIG. 2 differs from the embodiment in FIG. 1 in that the shunt reference IC1 is replaced by an NPN bipolar transistor P3 or an N-channel MOSFET. This results in a base-emitter-voltage of approximately 0.7 V for the reference voltage threshold value.

Figure 3:
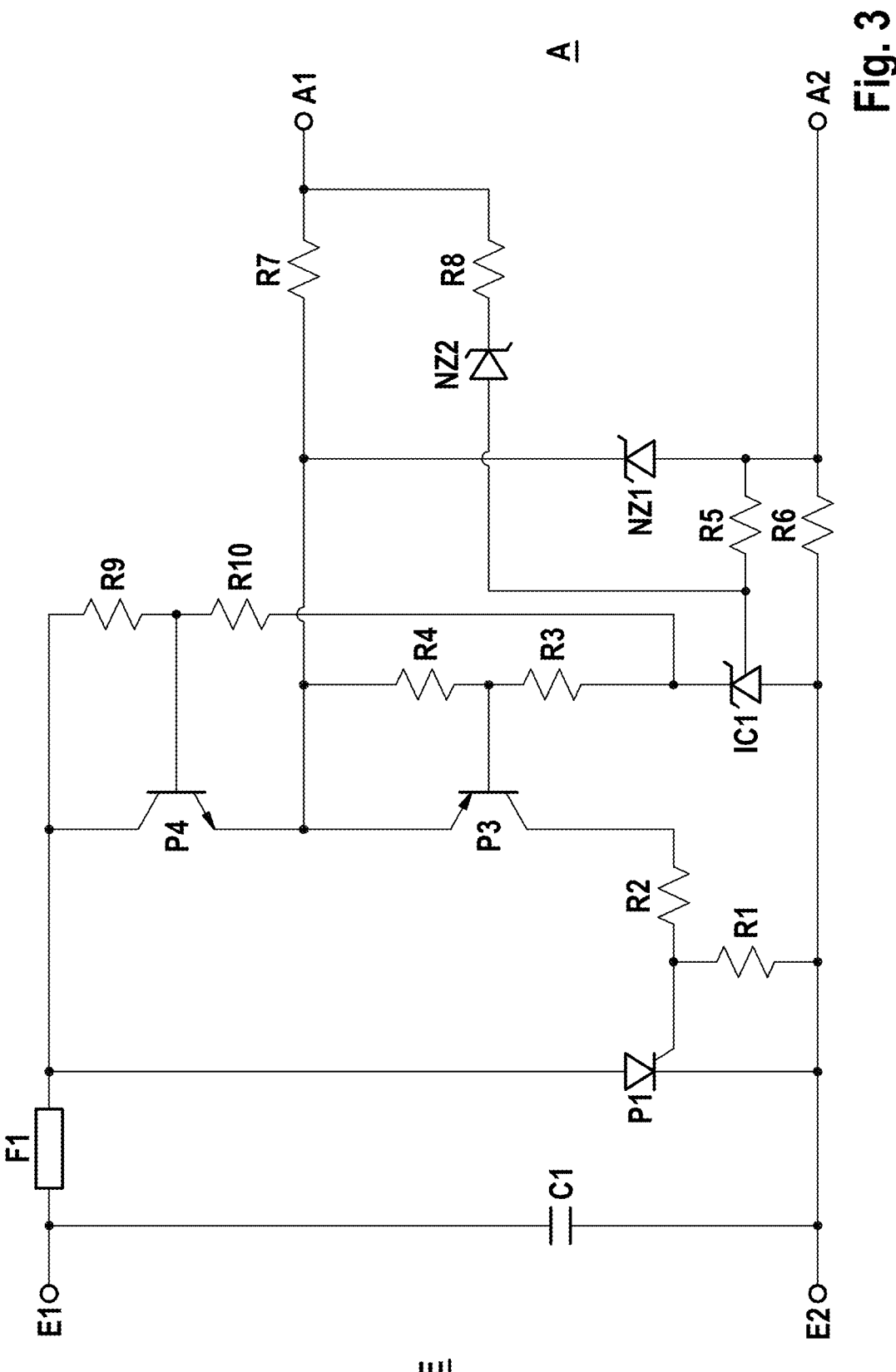
FIG. 3 is a schematic representation of a crowbar circuit according to a further embodiment.

FIG. 3 shows a further embodiment of the crowbar circuit 1, in which a current limitation is being realized within the current-carrying line. This current limitation can be implemented, for example, by an NPN bipolar transistor P4 or as a self-locking N-channel MOSFET. This can be controlled depending on the cathode voltage at the cathode connection of the shunt reference IC1. In particular, the base terminal of the NPN bipolar transistor P4 is connected to the voltage potential of the first input terminal via a ninth resistor and to the cathode terminal of the shunt reference IC1 via a tenth resistor.

As long as the load current is less than the set trigger current of the crowbar circuit 1, no significant current flows through the shunt reference IC1, as well as through the third and fourth resistor R3, R4. As soon as the set limit value of the load current through the first Zener diode NZ1 or the eighth resistor R8 is exceeded, the shunt reference IC1 becomes low-resistance and a current flows through the tenth resistor R10, which reduces the voltage at the base connection of the NPN-transistor P4, and wherein the voltage at the emitter of the NPN-transistor P4 is also reduced. The current through the first Zener diode NZ1 and the seventh resistor R9 decreases in sequence until the load current reaches the value of the trigger current again. This allows a current limit to be realized, which initially prevents an immediate triggering of the crowbar circuit 1.

In order for the first transistor P1 to become conductive, a base-emitter-voltage Ube<−0.6 V must be applied to the transistor P3. The base-emitter-voltage of transistor P3 corresponds to the voltage drop across the fourth resistor R4: Ube(P3)=U(R4). The resistance value of the third resistor R3 will generally be greater than the resistance value of the fourth resistor R4, such that U(R3+R4)=approx. −2 . . . −5 V follows as the triggering condition. For the transistor P4 to be conductive, its base-emitter-voltage Ube(P4) must be >0.6 V, i.e. U(R10)>0.6 V+U(R3+R4). Thus, the ninth and tenth resistors R9 and R10 can be dimensioned in such a way that the transistor P4 switches off before transistor P3 switches on.

In order to meet the requirements of explosion protection, it may be necessary in the above embodiments to design individual components of the crowbar circuit 1 or entire circuit blocks to be multiple redundant. In order to realize an inertia upon triggering the crowbar circuit 1, the resistor R4 can be replaced by a low-pass filter, which results in a time delay upon triggering the thyristor P1.

In principle, the above-mentioned circuit may be designed in two complementary configurations such that the short circuit is triggered upon determining that the reference voltage threshold value is exceeded or that the reference voltage threshold value is fallen below, respectively.

Typical exemplary values for parameters of the relevant components are:

Breakdown voltage of the first Zener diode NZ1: 8 to 24 V (can also be represented by 2 to 3 Zener diodes in series, e.g. 3×8 V for 24 V).

Breakdown voltage of the second Zener diode NZ2: Lower value than for NZ1, 4 to 12 V.

R5: 10 to 20 kiloohm

R6: 41 to 100 ohm

R7: usually larger than R6, 70 to 360 ohm

R8: usually larger than R5, 20 to 200 kiloohm

The invention claimed is:

1. A crowbar circuit, for use in a voltage converter, comprising:

a triggering device configured to trigger or cause a short circuit across input terminals depending on a control voltage;

a comparator configured to trigger the triggering device for triggering the short circuit depending on a comparator voltage at a comparator input of the comparator and depending on a predetermined reference voltage threshold value, a Zener diode with a predetermined breakdown voltage in series with a first resistor, which are connected between one of the input terminals and the comparator input, such that when an applied input voltage exceeds the predetermined breakdown voltage, the comparator voltage exceeds or falls under the predetermined reference voltage threshold value, thus triggering or causing the short circuit;

a series connection of a second resistor, an third resistor, the first resistor and a fourth resistor, wherein a load current at an output of the crowbar circuit flows through the second and fourth resistors and the comparator input is electrically connected to a node between the first and eighth third resistors, and the series connection is connected between the input terminals, such that when a predetermined threshold current is exceeded, the comparator voltage exceeds or falls under the predetermined reference voltage threshold value, thus triggering the short circuit.

2. The crowbar circuit according to claim 1, wherein the comparator comprises a shunt reference with the predetermined reference voltage threshold value or a bipolar transistor in which the predetermined reference voltage threshold value is determined by a base-emitter-voltage of the bipolar transistor.

3. The crowbar circuit according to claim 1, wherein a further Zener diode is connected in series with the third resistor in a reverse direction.

4. The crowbar circuit according to claim 1, wherein a low-pass filter is provided between the triggering device and the comparator, such that a time delay is provided when triggering the short circuit if it is detected that the comparator voltage exceeds or falls below the predetermined reference voltage threshold value.

5. The crowbar circuit according to claim 1, wherein the comparator input is directly connected via the first resistor to one of two output terminals at which a high and a low output potential is provided.

6. The crowbar circuit according to claim 5, wherein the fifth first resistor is connected to the output terminal for the low output potential, wherein a resistance value of the second resistor is greater than a resistance value of the fourth resistor.

7. The crowbar circuit according to claim 5, wherein the first resistor is connected to the output terminal for the high output potential, in particular, wherein a resistance value of the second resistor is lower than a resistance value of the fourth resistor.

8. The crowbar circuit according to claim 1, wherein the Zener diode and the fourth resistor are connected in series between the input terminals.

9. The crowbar circuit according to claim 1, wherein a current limitation is realized within a load current-carrying line, which limits a flowing load current when the comparator voltage is detected to exceed or fall below the predetermined reference voltage threshold value.

10. The crowbar circuit according to claim 1, wherein one of the input terminals is provided with a safety fuse which interrupts a current flow when the short circuit is triggered.

* * * * *